United States Patent
Hahn et al.

(10) Patent No.: US 8,371,488 B2
(45) Date of Patent: Feb. 12, 2013

(54) SETTING TOOL

(75) Inventors: Wolfram Hahn, Friedrichshafen (DE); Karl Franz, Feldkirch (AT); Tilo Dittrich, Grabs (CH)

(73) Assignee: Hilti Aktiengesellschaft, Schaan (LI)

( * ) Notice: Subject to any disclaimer, the term of this patent is extended or adjusted under 35 U.S.C. 154(b) by 1346 days.

(21) Appl. No.: 11/517,724

(22) Filed: Sep. 7, 2006

(65) Prior Publication Data

US 2007/0057007 A1    Mar. 15, 2007

(30) Foreign Application Priority Data

Sep. 13, 2005 (DE) .......................... 10 2005 000 114

(51) Int. Cl.
*B25C 1/14* (2006.01)

(52) U.S. Cl. .......................................... 227/10; 267/153

(58) Field of Classification Search ............... 227/10, 227/156; 173/210, 162.1; 267/137, 139, 267/140.3, 140.4, 151–153, 136, 259, 292, 267/293, 141.3
See application file for complete search history.

(56) References Cited

U.S. PATENT DOCUMENTS

| | | | | |
|---|---|---|---|---|
| 3,251,270 A | | 5/1966 | Seifried | |
| 4,011,929 A | * | 3/1977 | Jeram et al. | 188/268 |
| 4,122,987 A | * | 10/1978 | Jochum et al. | 227/10 |
| 4,173,130 A | * | 11/1979 | Sutliff et al. | 464/7 |
| 4,222,462 A | * | 9/1980 | Ottestad | 188/67 |
| 4,609,135 A | * | 9/1986 | Elliesen | 227/130 |
| 4,706,788 A | * | 11/1987 | Inman et al. | 188/378 |
| 4,776,436 A | * | 10/1988 | Nenkov et al. | 188/268 |
| 4,824,003 A | | 4/1989 | Almeras et al. | |
| 5,050,687 A | * | 9/1991 | Prokhorov et al. | 173/133 |
| 5,056,701 A | * | 10/1991 | Bereiter | 227/10 |
| 5,199,833 A | * | 4/1993 | Fehrle et al. | 408/239 R |
| 5,538,172 A | * | 7/1996 | Jochum et al. | 227/10 |
| 5,950,900 A | * | 9/1999 | Frommelt et al. | 227/9 |
| 6,059,162 A | * | 5/2000 | Popovich et al. | 227/10 |
| 6,123,242 A | | 9/2000 | Kersten | |
| 6,123,243 A | * | 9/2000 | Pfister et al. | 227/10 |
| 6,220,495 B1 | * | 4/2001 | Jakob | 227/10 |
| 6,298,963 B1 | * | 10/2001 | Kim | 188/379 |

(Continued)

FOREIGN PATENT DOCUMENTS

| | | |
|---|---|---|
| DE | 3930592 | 9/1990 |
| DE | 4130445 | 3/1993 |

(Continued)

OTHER PUBLICATIONS

Wikipedia definition of "particle" in a Wiktionary entry found at http://en.wiktionary.org/wiki/particle, printed Mar. 12, 2008.

*Primary Examiner* — Hemant M Desai
*Assistant Examiner* — Gloria R Weeks
(74) *Attorney, Agent, or Firm* — Abelman, Frayne & Schwab

(57) ABSTRACT

A setting tool for driving fastening elements in a constructional component includes piston stop device (30) for braking the setting piston (20) and which is located at an end region of the hollow chamber (14) of the piston guide (13) in which the setting piston is displaceable, adjacent to the bolt guide (12), and has a stop element for the setting piston (20) and which has a first ring (31) and a second ring (32) arranged coaxially with each other and displaceable relative to each other, and a receiving space (3) provided between the two rings and filled with particles (34) with respect to which the receiving space is sealed.

15 Claims, 4 Drawing Sheets

U.S. PATENT DOCUMENTS

| | | | | |
|---|---|---|---|---|
| 6,478,207 B2 * | 11/2002 | Ehmig et al. | | 227/10 |
| 6,481,609 B2 * | 11/2002 | Dittrich et al. | | 227/10 |
| 6,536,647 B2 * | 3/2003 | Buchel et al. | | 227/10 |
| 6,679,411 B2 * | 1/2004 | Popovich et al. | | 227/10 |
| 6,776,320 B2 * | 8/2004 | Sprenger et al. | | 227/10 |
| 6,779,698 B2 * | 8/2004 | Lin | | 227/130 |
| 6,779,955 B2 * | 8/2004 | Rivin | | 409/234 |
| 6,802,405 B2 * | 10/2004 | Barcock et al. | | 188/268 |
| 7,055,727 B2 * | 6/2006 | Rohrmoser et al. | | 227/10 |
| 2002/0130155 A1 * | 9/2002 | Bonig et al. | | 227/10 |
| 2003/0083186 A1 * | 5/2003 | Hetcher et al. | | 493/464 |

FOREIGN PATENT DOCUMENTS

| | | |
|---|---|---|
| FR | 2653869 | 5/1991 |
| SU | 0983344 | 12/1982 |
| SU | 0757409 | 8/1990 |

* cited by examiner

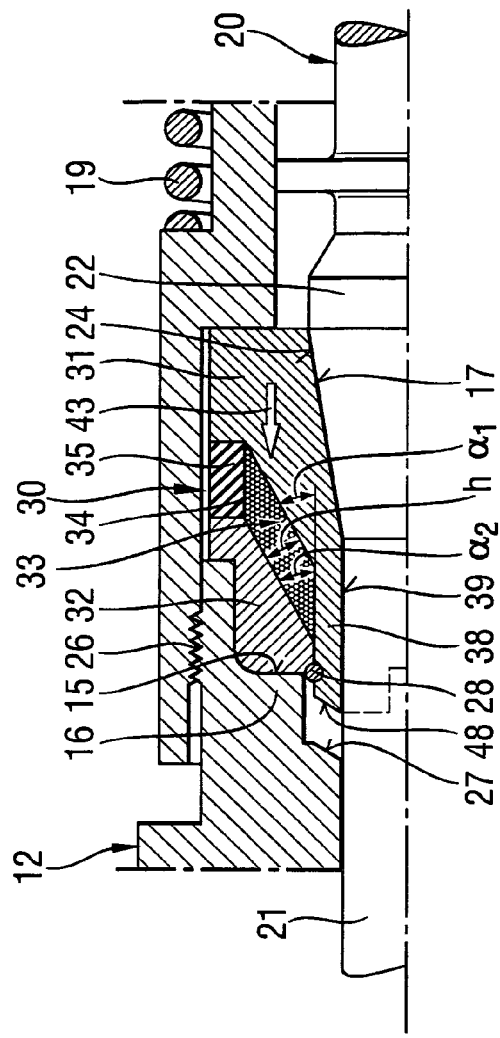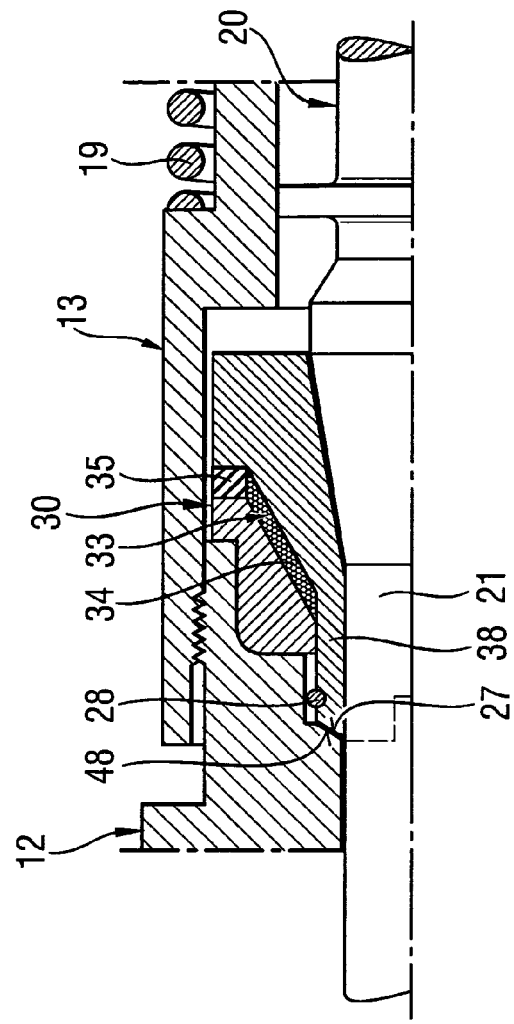
Fig. 2a
Fig. 2b

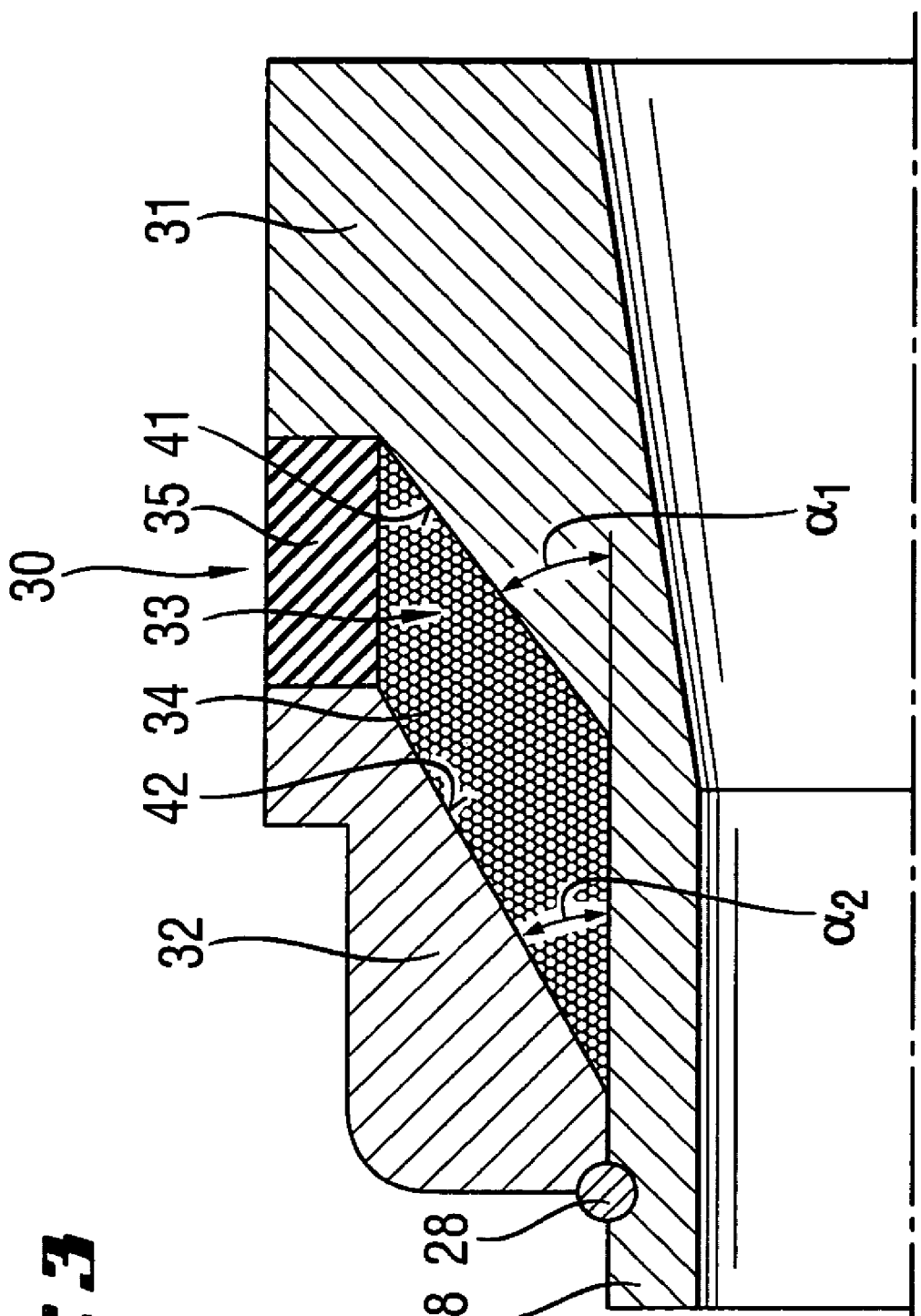

SETTING TOOL

BACKGROUND OF THE INVENTION

1. Field of the Invention

The present invention relates to a setting tool for driving fastening elements in a constructional component and including a piston guide having a hollow chamber, a setting piston axially displaceable in the hollow chamber and having a piston head and a piston stem adjoining the piston head, a bolt guide adjoining the piston guide in a setting direction of the setting tool, and a piston stop device for braking the setting piston, located at an end region of the hollow chamber adjacent to the bolt guide, and having a stop element for the setting piston.

2. Description of the Prior Art

Setting tools of the type described above can be operated with solid, gaseous, or fluid fuels or with compressed air. With combustion-operated setting tool, the setting piston is driven by combustion gases. The setting tool can drive fastening elements such as, e.g., nails or bolts in a constructional component.

In setting tools such as disclosed in German Publication DE 39 30 592 A1, the setting piston is displaceably arranged in a piston guide axially displaceable in a housing sleeve of the setting tool. For initiating a setting process, the setting tool has to be pressed against a constructional component so that the piston guide is pushed into the housing sleeve. In order to reduce the piston energy at faulty settings or to reduce an excessive setting energy, there is provided, in the front portion of the piston guide, in the end region of the piston guide adjacent to the bolt guide, an elastic annular member for braking the setting piston.

The drawback of the known setting tool consists in that when the wear of the elastic annular member is too large and the wear is not recognized, essential and expensive tool components can be damaged. Further, the piston collar that impacts the annular member, should have as large a diameter as possible to prevent a premature damage of the annular member. This increases the weight of the setting tool. On the other hand, because of the elasticity of the annular member, the setting piston rebounds after impacting the annular member, and this leads, in particular at a high setting energy, to undesirable second blows with the setting piston.

German patent DE 196 17 671 C1, from which the present invention proceeds, discloses a powder charge-operated bolt setting tool with a setting piston displaceable in a guide bore. The setting piston has a piston head and a piston stem, with the piston head forming, at its side adjacent to the piston stem, a conical section. A conical receptacle, which is provided at the mouth-side end of the guide part, is arranged opposite the conical section formed by the piston head. At a faulty setting or an excessive setting energy, the conical section of the piston head passes into the conical receptacle. A damping disc, which is arranged behind the conical receptacle in the setting direction, dampens the impact of the piston.

In the setting tool of the above-mentioned German patent, an increased wear of the elastic damping disc, which takes place in the setting tool of DE 39 30 592 A1, is prevented. However, in the setting tool of the German patent, the other drawback of DE 39 30 592 A1, namely, rebound of the setting piston, leading to secondary blows, remains.

U.S. Pat. No. 4,824,003 discloses a setting tool in which between the piston guide and the bolt guide, there are provided a first rigid ring and an elastic ring arranged one after another. In the elastic ring, there is provided a further, more rigid ring that limits the stroke of the first rigid ring. The first rigid ring has a through-guide for the piston stem tapering in the setting direction. The piston collar surface adjacent to the first rigid ring is formed as a conical surface, with the profiles of the conical surface of the through-guide and the conical surface of the piston collar complementing each other.

The setting tool of the U.S. patent has the same drawback as the setting tool of the German patent. Here, likewise, possible rebounds of the setting piston can lead to the secondary blows.

Accordingly, an object of the present invention is to provide a setting tool of the type discussed above in which the foregoing drawbacks are eliminated, and the rebound speed of the setting piston is reduced to a minimum.

SUMMARY OF THE INVENTION

This and other objects of the present invention, which will become apparent hereinafter, are achieved by providing a setting tool in which the stop element has a first ring and a second ring arranged coaxially with each other and displaceable relative to each other, and a receiving space is provided between the first ring and the second ring and is filled with particles with respect to which the receiving space is sealed.

With the piston stop device according to the present invention, at a faulty setting, the impact energy is almost completely converted into heat which is generated by friction between the particles when the first ring compresses the receiving space and presses the particles, which fill the receiving space, toward the second ring. The particles prevent rebound of the setting piston to a most possible extent. The second ring can be formed as one-piece with the bolt guide. The receiving space can have, e.g., a height, in a direction perpendicular to a base, of 1 mm-5 mm.

Advantageously, the receiving space extends between two opposite conical limiting surfaces of the two rings. As a result, the receiving space also has a corresponding conical shape that insures a good pressure distribution on the particles at a faulty setting.

With the first ring and the second ring being supported against each other by an elastic element, e.g., a spring or a rubber element, the return of the first ring to its initial position away from the second ring and expansion of the receiving space after impact by the setting piston is insured in a simple manner.

It is advantageous when the elastic element is formed by an elastic annular body arranged between the first ring and the second ring and closing the receiving space radially outwardly. With such annular body, not only return of the rings to their initial position and expansion of the receiving space is achieved, but also sealing of the receiving space is insured. The sealing of the receiving space prevents exit of the particles radially outwardly. Further, the particles are displaced in the direction of the annular body under pressure, which positively influences the displacement between the first and second rings.

Advantageously, the particles have a size from 0.1 mm to 5.0 mm. When the particles are formed as balls, the size of the particles corresponds to the diameter of the balls. The ball-shaped particles prevent the rebound of the setting tool particularly good.

It is advantageous when the particles are surrounded circumferentially with a lubricant such as, e.g., oil or graphite. The lubricant improves the return characteristics of the particles.

Advantageously, the particles are formed as steel balls with a hardness of 40-65 HRC. Such particles have good mechanical properties and a long service life. However, other metal, ceramics or other suitable minerals can be used.

With the conical limiting surfaces having each the same cone half-angle in a range from 10° to 50°, advantageously, a good distribution of pressure, which is applied to the particles, is achieved.

Alternatively, the conical limiting surfaces can have different cone half-angles lying in a range from 10° to 50° and distinguishing from each other by 0.5°-5°. The angle and the angle difference can depend on the material and the size of the particles.

According to a further advantageous embodiment of the invention, at least one flexible element, e.g., an element formed of a strongly compressible foamed material, can be provided in the receiving space. This element provides an additional expansion space for the particles. Alternatively to the foamed material part, a hollow space can be provided between the elastic annular body and a sleeve that circumferentially surrounds the annular body. The elastic annular body can expand into the hollow space.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show:

FIG. 2a a view of a detail of the setting tool shown in FIG. 1 marked with reference character II at an increased, in comparison with FIG. 1, scale;

FIG. 2b a view similar to that of FIG. 2 with a closed piston stop element;

FIG. 3 a view of a detail of another embodiment of a setting tool according to the present invention similar to that of FIGS. 2a-2b.

DETAILED DESCRIPTION OF THE PREFERRED EMBODIMENTS

Figure 1:
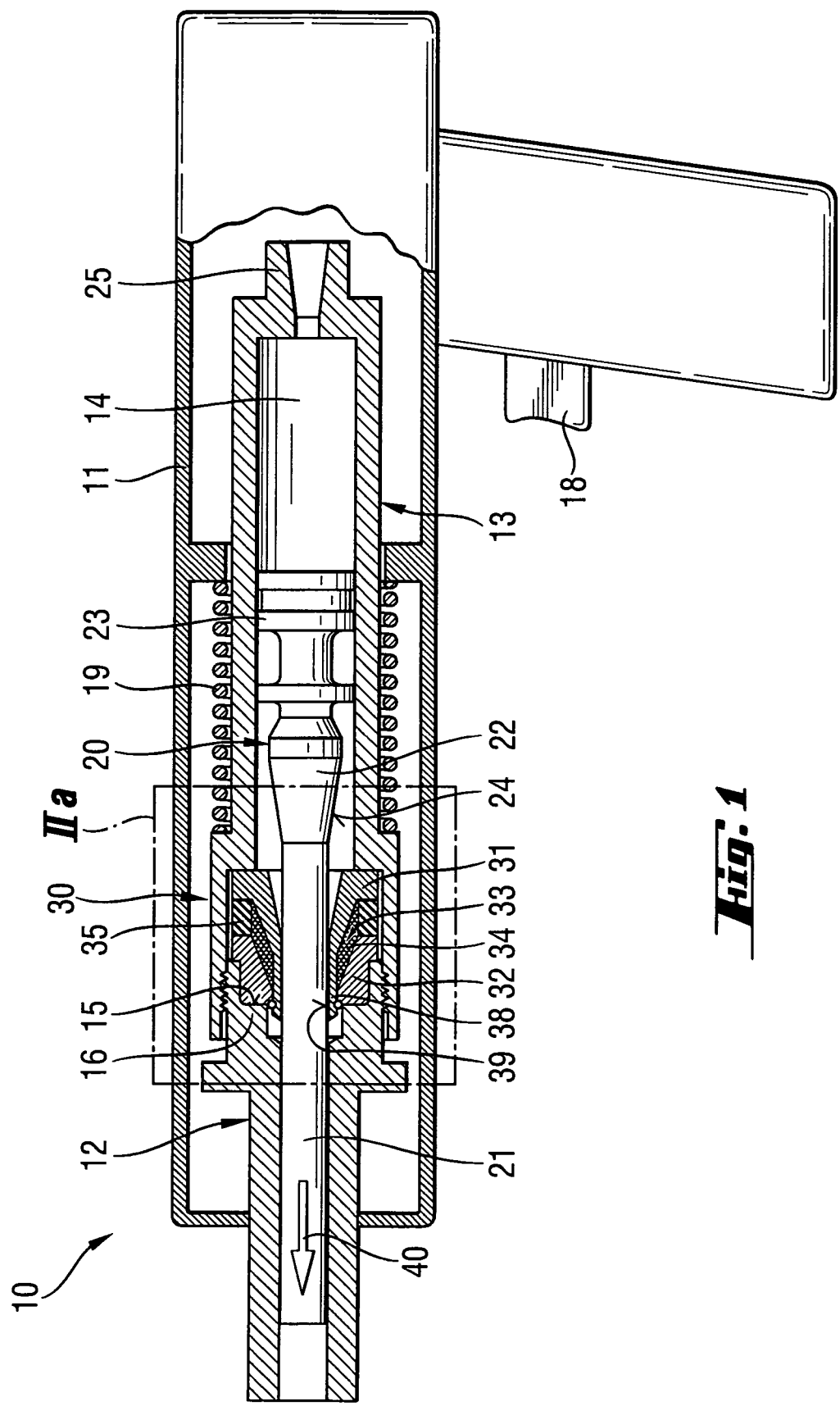
FIG. 1 a longitudinal, partially cross-sectional view of a setting tool according to the present invention with a piston stop device.

A setting tool 10 according to the present invention, which is shown in FIGS. 1-2a, has a piston stop device generally designated with a reference numeral 30. The setting tool 10 further includes a one- or multi-piece housing 11 and a piston guide 13 arranged in the housing 11. In the hollow chamber 14 of the piston guide 13, a setting piston 20 is displaceably arranged. The setting piston 20 is driven by a propellant or its reaction products, e.g., combustion gases or the like. The setting piston 20 has a piston stem 21 that adjoins, in a setting direction 40 of the setting tool 10, a piston head 23. On a piston stem 21, there is provided a piston collar 22 in a spaced relationship to the piston head 23. The piston collar 22 has a counter-stop surface 24 facing in a direction of the piston stop device. The counter-stop surface 24 is formed, in the embodiment shown in FIGS. 1-2, as a conical surface. The piston collar 22 can be arranged differently than shown in the drawings but always should be located in a region of the piston head 23 lying in the setting direction. The piston guide 13 is displaceably supported in the sleeve-shaped housing 11 and is supported against the housing 11 by a spring 19. At an end of the piston guide 13 facing in a direction opposite the setting direction 40, there is provided a cartridge socket 25 for receiving a propellant in the form of a cartridge, pellet or blister.

A setting process with the setting tool 10 is only then possible when the setting tool 10 is pressed with a bolt guide 12, which is located in front of the piston guide 13 in the setting direction 40, against a constructional component (not shown). An interface 26, at which the bolt guide 12 is connected with the piston guide 13, is formed, e.g., as a threaded section. For activating the setting tool 10 for initiating a setting process, there is provided on the setting tool 10, an actuation switch 18.

At the end of the piston guide 13 adjacent to the bolt guide 12, the above-mentioned piston stop device 30 is located. The piston stop device 30 is supported against bottom 15 of a receptacle 16 formed in the bolt guide 12. In the embodiment shown in the drawings, the piston stop device 30 has a first ring 31 which is formed as a metal conical ring, and a second ring 32 which is also formed as a metal conical ring. The first ring 31 and the second ring 32 form together a stop element. Between the first ring 31 and the second ring 32, there is provided an elastic annular body 35 made of, e.g., a high-molecular butadiene resin (HNBR) and keeping the two metal rings at a distance from each other, with formation of a receiving space 33 between the two metal rings 31 and 32. The receiving space 33 is filled with particles 34 in form of steel balls. Toward the setting piston 20, the receiving space 33 is closed by a cylindrical section 38 of the first ring 31. The second ring 32 is supported on the cylindrical section 38 and is secured in its position with a locking element 28, such as, e.g., locking ring, under a light preload of the elastic annular body 35. Instead of steel balls, ceramic balls can be used. The particles 34 have a diameter of about 0.2 mm and are, preferably, coated with a graphite powder. However, generally, the particles 34 can have a diameter from about 0.1 mm to 5 mm. The used steel balls have a hardness of about 56 HRC. However, generally, steel balls, which have a hardness from about 40 to 65 HRC.

The receiving space 33 is located between a first conical limiting surface 41 which is formed by the first ring 31, and a second conical limiting surface 42 which is formed by the second ring 32. Both conical limiting surfaces 41, 42 have, in the embodiment shown in FIGS. 1-2a, the same cone half-angle $\alpha_1$, $\alpha_2$ of 16°. However, a cone half-angle in a range of 10°-50° proved to be acceptable. The receiving space 33 has, in the embodiment shown in the drawings, in the direction perpendicular to the base which is formed by both conical limiting surface 41, 42, a height h of 2 mm. The height h corresponds to the thickness of the layer of particles 34 which fill the receiving space 33. Generally, a height h or the layer thickness of particles 34 in a range of from about 1 mm to 5 mm proved to be favorable.

At a side of the first ring 31 remote from the bolt guide 12, there is formed a stop surface 17 which in the embodiment shown in the drawings, is formed as a conical surface. The setting piston 20 can rebound from the stop surface 17 upon a contact therewith of the counter-stop surface 24 formed by the piston collar 22 in order to be braked by the piston stop device 30 when the setting piston 20 is displaced forward toward the first ring 31 with an increased setting energy as a result of faulty setting or a two strong propellant. The counter-stop surface 24 is complementary to the stop surface 17 and is also formed, in the embodiment shown in the drawings, as a conical surface. The first ring 31 has a through-opening 39 through which the setting piston 20 is extendable.

When the setting piston 20 impacts the piston stop device 30 upon being displaceable in the setting direction 40, the first ring 31 is pressed in the direction of arrow 43 against the elastic annular body 35 and the particles 34 in the receiving space 33. The particles 34 then press against the second ring 32 and provide for displacement of the first ring 31 in the direction of the arrow 43 toward the second ring 32. Because of a high friction of the particles 34 relative to each other, a large portion of the impact energy is converted into heat, and the plastic deformation of the particles 34 is only minimal. the particles 34 prevent rebound of the setting piston 20 because the friction forces therebetween also act in a direction opposite the direction of arrow 43.

The elastic annular body 35 becomes compressed in the axial direction upon impact of the setting piston 20. Further, the particles 34 can be shifted in the direction of the elastic annular body 35 and compress it sidewise. At the end of the impact process, the elastic annular body 35 provides for return of the piston stop device 30 to its initial position. The particles 34 assume, in this position, their original configuration.

FIG. 2b shows the piston stop device 10 in its closed position. The static operating stroke of the setting piston 20 is greater by about 2 mm. The end of the cylindrical section 38 of the first ring 31 adjacent to the bolt guide 12 is provided with an inclined surface 48 which is displaced against opposite inclination surface 27 of the bolt guide 12 and is deformed thereby inward. As a result of the inward pressure applied by the surface 27 of the bolt guide 12, the piston stem 21 of the setting piston 20 becomes clamped in the piston stop device 30. This indicates, to the user, the wear of the piston stop device 30.

The filling of the receiving space 33 with particles 34 during manufacturing or maintenance of the piston stop device 30 can be effected, on one hand, through a bore in one of the rings 31, 32, with shaking contributing to setting of the particles 34. On the other hand, filling in a pre-assembled condition with the elastic annular member 35 being displaced sidewise is also possible.

As a further alternative, filling the receiving space 33 with a metered amount of the particles 34, with the rings 31, 32 being pushed away from each other, is also possible. Further, placing of one of the rings 31, 32 against the particles 34, which is mechanically distorted by a first piston stop step, is also possible. In this way, the particles 34 are ready to perform their function after the very first actuation of the piston stop device 30.

The setting tool shown in FIG. 3 differs from that of FIGS. 1-2a, 2b in that the cone half-angles $\alpha_1$, $\alpha_2$ are different from each other. Thus, the first cone half-angle $\alpha_1$, of the first limiting surface 41 amounts to 18° whereas the second half-angle $\alpha_2$ of the second limiting surface 42 amounts to 16°. This permits to achieve a better distribution of pressure. For description of elements designated with other reference numerals, reference is made to the description above made with reference to FIGS. 1-2a, 2b.

Figure 4:
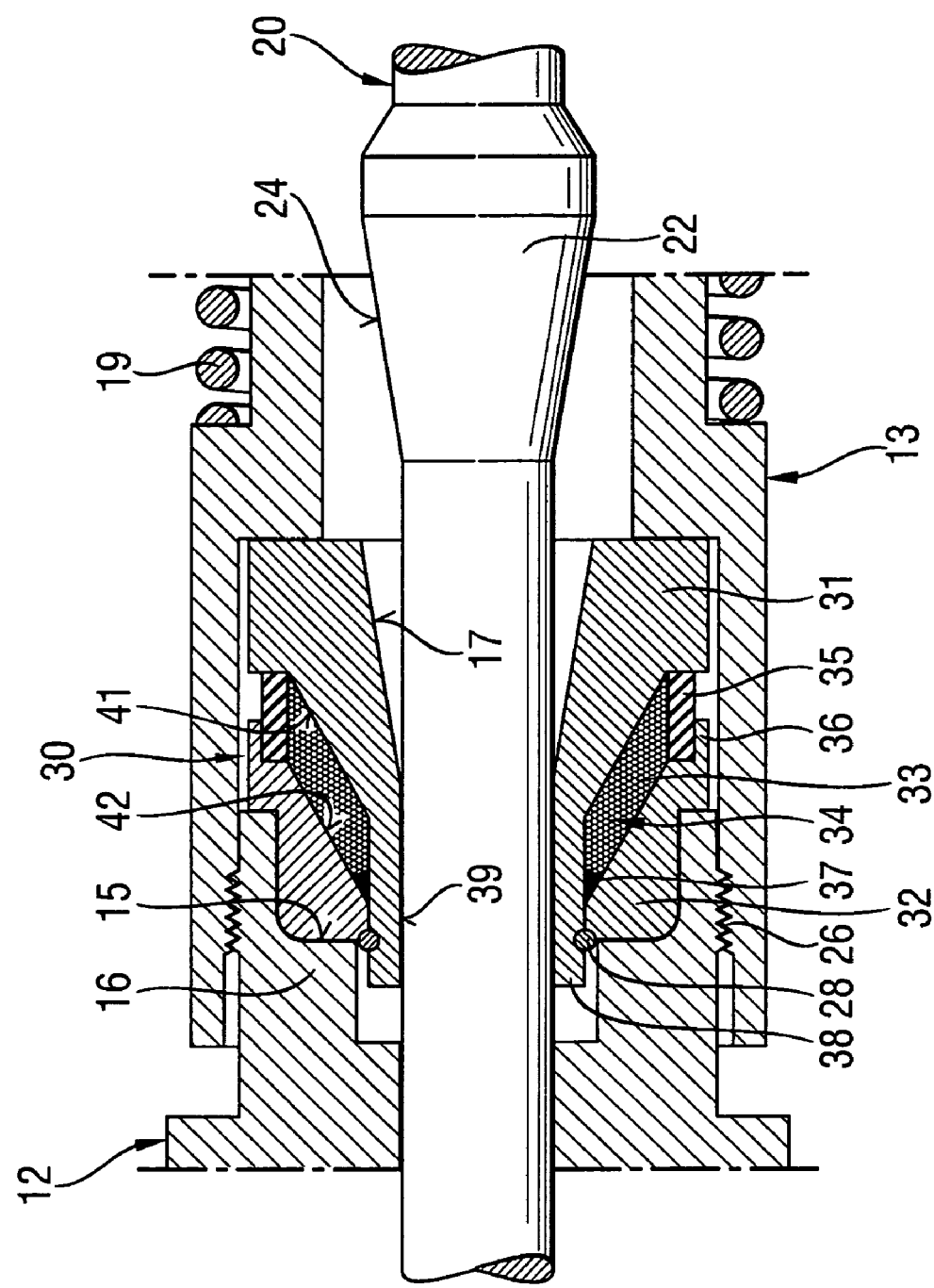
FIG. 4 a cross-sectional longitudinal view of a detail of another embodiment of a setting tool according to the present invention.

The setting tool, which is shown in FIG. 4, distinguishes from the preceding setting tools in that a flexible member 37 such as, e.g., an element formed of a foamed material, is located in the receiving space 33, which improves the freedom of movement of the particles 34. Further, the elastic annular body 35 is held radially outwardly by a circumferential projection 36 of the second ring 32, which prevents a complete outward expansion of the elastic annular body 35. With this embodiment, the stop path of the setting piston 20 can be adjusted by changing the volume of the flexible member 37. The separation of functions between the elastic annular member 35 and the flexible member 37, the return function by the elastic annular body 35 and the adjusting function by the volume-variable flexible member 37, permits to better define the braking effect.

As a variant, it can be contemplated to completely surround the return resin with a steel sleeve. With respect to the rest of the description, a reference is made to a previous description with reference to FIGS. 1-2b in its entirety.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A setting tool for driving fastening elements in a constructional component, comprising:
    a piston guide (13) having a hollow chamber (14);
    a setting piston (20) axially displaceable in the hollow chamber (14) and having:
        a piston head (23); and
        a piston stein (21) adjoining the piston head (23);
    a bolt guide (12) adjoining the piston guide (13) in a setting direction (40) of the setting tool (10); and
    a piston stop device (30) for braking the setting piston (20) and located at an end region of the hollow chamber (14) adjacent to the bolt guide (12), the piston stop device (30) having a stop element for the setting piston (20) and having a first ring (31) and a second ring (32) arranged coaxially with each other and displaceable relative to each other, and a receiving space (33) provided between the first ring (31) and the second ring (32) and substantially filled up with particles (34) with respect to which the receiving space (33) is sealed;
    wherein the particles (34) have a particle size between 0.1 mm and 5 mm, and wherein the first ring (31) and the second ring (32) are supported against each other by an elastic element.

2. A setting tool according to claim 1, wherein a portion of each of the two rings (31, 32) is a conical element with a surface thereof forming a respective conical limiting surface (41, 42); and
    wherein the receiving space (33) extends between the conical limiting surfaces (41, 42) of the two rings (31, 32).

3. A setting tool according to claim 2, wherein the conical limiting surfaces (41, 42) each have a respective cone half-angle ($\alpha_1$, $\alpha_2$) equal to each other and each being in a range from 10° to 50°.

4. A setting tool according to claim 2, wherein the conical limiting surfaces (41, 42) each have a respective cone half-angle ($60_1$, $\alpha_2$) lying in a range from 10° to 50° and distinguishing from each other by from 0.5° to 5°.

5. A setting tool according to claim 1, wherein the elastic element is formed by an elastic ring body (35) arranged between the first ring (31) and the second ring (32) and closing the receiving space (33) radially outwardly.

6. A setting tool according to claim 1, wherein the particles (34) are circumferentially surrounded with lubrication means.

7. A setting tool according to claim 1, wherein the particles (34) are formed as steel balls having a hardness of 40-65 HRC.

8. A setting tool according to claim 1, wherein a flexible member (37) is located in the receiving space (33).

9. A setting tool for driving fastening elements in a constructional component, comprising:
a piston guide (13) having a hollow chamber (14);
a setting piston (20) axially displaceable in the hollow chamber (14) and having:
 a piston head (23); and
 a piston stem (21) adjoining the piston head (23);
a bolt guide (12) adjoining the piston guide (13) in a setting direction (40) of the setting tool (10);
a piston stop device (30) for braking the setting piston (20) and located at an end region of the hollow chamber (14) adjacent to the bolt guide (12), the piston stop device (30) having a stop element for the setting piston (20) and having a first ring (31) and a second ring (32) arranged coaxially with each other and displaceable relative to each other, and a receiving space (33) provided between the first ring (31) and the second ring (32) and substantially filled up with particles (34) with respect to which the receiving space (33) is sealed; and
a flexible member (37) is located in the receiving space (33), and wherein the first ring (31) and the second ring (32) are supported against each other by an elastic element.

10. The setting tool according to claim 9, wherein a portion of each of the two rings (31, 32) is a conical element with a surface thereof forming a respective conical limiting surface (41, 42); and
 wherein the receiving space (33) extends between the conical limiting surfaces (41, 42) of the two rings (31, 32).

11. The setting tool according to claim 10, wherein the conical limiting surfaces (41, 42) each have a respective cone half-angle ($\alpha_1$, $\alpha_2$) equal to each other and each being in a range from 10° to 50°.

12. The setting tool according to claim 10, wherein the conical limiting surfaces (41, 42) each have a respective cone half-angle ($\alpha_1$, $\alpha_2$) lying in a range from 10° to 50° and distinguishing from each other by from 0.5° to 5°.

13. The setting tool according to claim 9, wherein the elastic element is formed by an elastic ring body (35) arranged between the first ring (31) and the second ring (32) and closing the receiving space (33) radially outwardly.

14. The setting tool according to claim 9, wherein the particles (34) are circumferentially surrounded with lubrication means.

15. The setting tool according to claim 9, wherein the particles (34) are formed as steel balls having a hardness of 40-65 HRC.

* * * * *